US008634324B2

(12) United States Patent
Lu et al.

(10) Patent No.: US 8,634,324 B2
(45) Date of Patent: *Jan. 21, 2014

(54) METHOD AND APPARATUS FOR PROVIDING SIGNATURE BASED PREDICTIVE MAINTENANCE IN COMMUNICATION NETWORKS

(75) Inventors: David Lu, Morganville, NJ (US); Hossein Eslambolchi, Los Altos Hills, CA (US); Paritosh Bajpay, Edison, NJ (US); John McCanuel, Bailey, CO (US); Roberta Bienfait, Norcross, GA (US); Carolyn Bekampis, Wayside, NJ (US); Mihail Vasilescu, Middletown, NJ (US); Mark Rogaski, Bound Brook, NJ (US); Wen-Jui Li, Middletown, NJ (US); Mohammed Shariff, Plainsboro, NJ (US); Thomas Dickey, Middletown, NJ (US); John Soares, Yonkers, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,498

(22) Filed: Sep. 13, 2012

(65) Prior Publication Data

US 2013/0028101 A1 Jan. 31, 2013

Related U.S. Application Data

(63) Continuation of application No. 11/067,936, filed on Feb. 28, 2005, now Pat. No. 8,274,904.

(51) Int. Cl.
*G01R 31/08* (2006.01)
*G06F 11/00* (2006.01)

(52) U.S. Cl.
USPC ............... 370/252; 370/218; 714/43; 714/57; 714/48

(58) Field of Classification Search
None
See application file for complete search history.

(56) References Cited

U.S. PATENT DOCUMENTS

| 5,848,073 | A | 12/1998 | Abdelmonem et al. |
| 5,974,237 | A | 10/1999 | Shurmer et al. |
| 6,816,483 | B1 | 11/2004 | Beckstrom et al. |
| 6,981,039 | B2 | 12/2005 | Cerami et al. |
| 7,069,177 | B2 | 6/2006 | Carley |
| 8,274,904 | B1 | 9/2012 | Lu et al. |
| 2002/0073062 | A1* | 6/2002 | Cerami et al. .................. 707/1 |
| 2002/0089925 | A1 | 7/2002 | Smith et al. |
| 2006/0153307 | A1 | 7/2006 | Brown et al. |
| 2006/0258291 | A1 | 11/2006 | Nakata et al. |

* cited by examiner

*Primary Examiner* — Ayaz Sheikh
*Assistant Examiner* — Sori Aga

(57) ABSTRACT

A method and apparatus for collecting and processing line performance data transmitted over cables, e.g., Y-cables, is disclosed. The present invention applies a method based on specific performance measurements, specific measurement time intervals, and compare results from different measurement time intervals to produce a "signature" that indicates deteriorating performance of a particular Y-cable. Once a "signature" is detected, the method will proactively and automatically generate a trouble ticket to trigger the dispatch maintenance staffs to service the cable, e.g., to perform the replacement of the Y-cable in question, thus completing the predictive maintenance process. A trouble ticket is a record used to report and manage the resolution of network related problems.

20 Claims, 4 Drawing Sheets

METHOD AND APPARATUS FOR PROVIDING SIGNATURE BASED PREDICTIVE MAINTENANCE IN COMMUNICATION NETWORKS

This application is a continuation of U.S. patent application Ser. No. 11/067,936, filed Feb. 28, 2005, which is currently allowed, and is herein incorporated by reference in its entirety.

The present invention relates generally to communication networks and, more particularly, to a method and apparatus for signature based predictive maintenance of cables, e.g., Y-cables, in a communication network, e.g. a Time Division Multiplexing (TDM) network, a Frame Relay (FR) network, an Asynchronous Transfer Mode (ATM) network, a Multi-Protocol Label Switched (MPLS) network, an Internet Protocol (IP) network, a packet network and the like.

BACKGROUND OF THE INVENTION

In order to enhance overall network reliability and availability, network providers often use cables, e.g., Y-cables, to interconnect network equipment to support network equipment protection using redundant line cards. A Y-cable is an electrical cable that has two connectors at one end and a single connector at the other end. All three endpoints of the Y-cable are interconnected electrically. However, when Y-cables have been used for an extensive period of time, they tend to become failure-prone and can cause service impacting outages. Y-cable failures cause long duration service impacting outages and contribute to customer dissatisfaction in a very significant way. In addition, each outage causes network providers to provide reactive problem diagnosis, isolation, repair, and customer status reporting. There is currently no automated method to capture the signature of deteriorating performance on Y-cables well in advance of actual failures. If imminent Y-cable failures can be detected, network providers can then proactively prioritize Y-cable replacements and automatically dispatch maintenance staffs to perform actual replacements to prevent service impacting outages.

Therefore, a need exists for a method and apparatus for signature based predictive maintenance for cables, e.g., Y-cables, in a communication network.

SUMMARY OF THE INVENTION

In one embodiment, the present invention collects and processes performance data of information transmitted over cables, e.g., Y-cables. The present invention applies a method based on specific performance measurements, specific measurement time intervals, and compare results from different measurement time intervals to produce a "signature" that indicates deteriorating performance of a particular cable, e.g., a Y-cable. Once a "signature" is detected, the method will proactively and automatically generate a trouble ticket to trigger the dispatch maintenance staffs to perform the replacement of the Y-cable in question, thus completing the predictive maintenance process. A trouble ticket is a record used to report and manage the resolution of network related problems.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In order to enhance overall network reliability and availability, network providers often use cables, e.g., Y-cables, to interconnect network equipment to support network equipment protection using redundant line cards. A Y-cable is an electrical cable that has two connectors at one end and a single connector at the other end. All three endpoints of the Y-cable are interconnected electrically. However, when Y-cables have been used for an extensive period of time, they tend to become failure-prone and can cause service impacting outages. Y-cable failures cause long duration service impacting outages and contribute to customer dissatisfaction in a very significant way. In addition, each outage causes network providers to provide reactive problem diagnosis, isolation, repair, and customer status reporting. There is currently no automated method to capture the signature of deteriorating performance on Y-cables well in advance of actual failures. If imminent Y-cable failures can be detected, network providers can then proactively prioritize Y-cable replacements and automatically dispatch maintenance staffs to perform actual replacements to prevent service impacting outages.

To address this criticality, the present invention collects and processes performance data of information transmitted over cables, e.g., Y-cables. The present invention applies a method based on specific performance measurements, specific measurement time intervals, and compare results from different measurement time intervals to produce a "signature" that indicates deteriorating performance of a particular Y-cable. Once a "signature" is detected, the method will proactively and automatically generate a trouble ticket to trigger the dispatch maintenance staffs to perform the replacement of the Y-cable in question, thus completing the predictive maintenance process. A trouble ticket is a record used to report and manage the resolution of network related problems.

Figure 1:
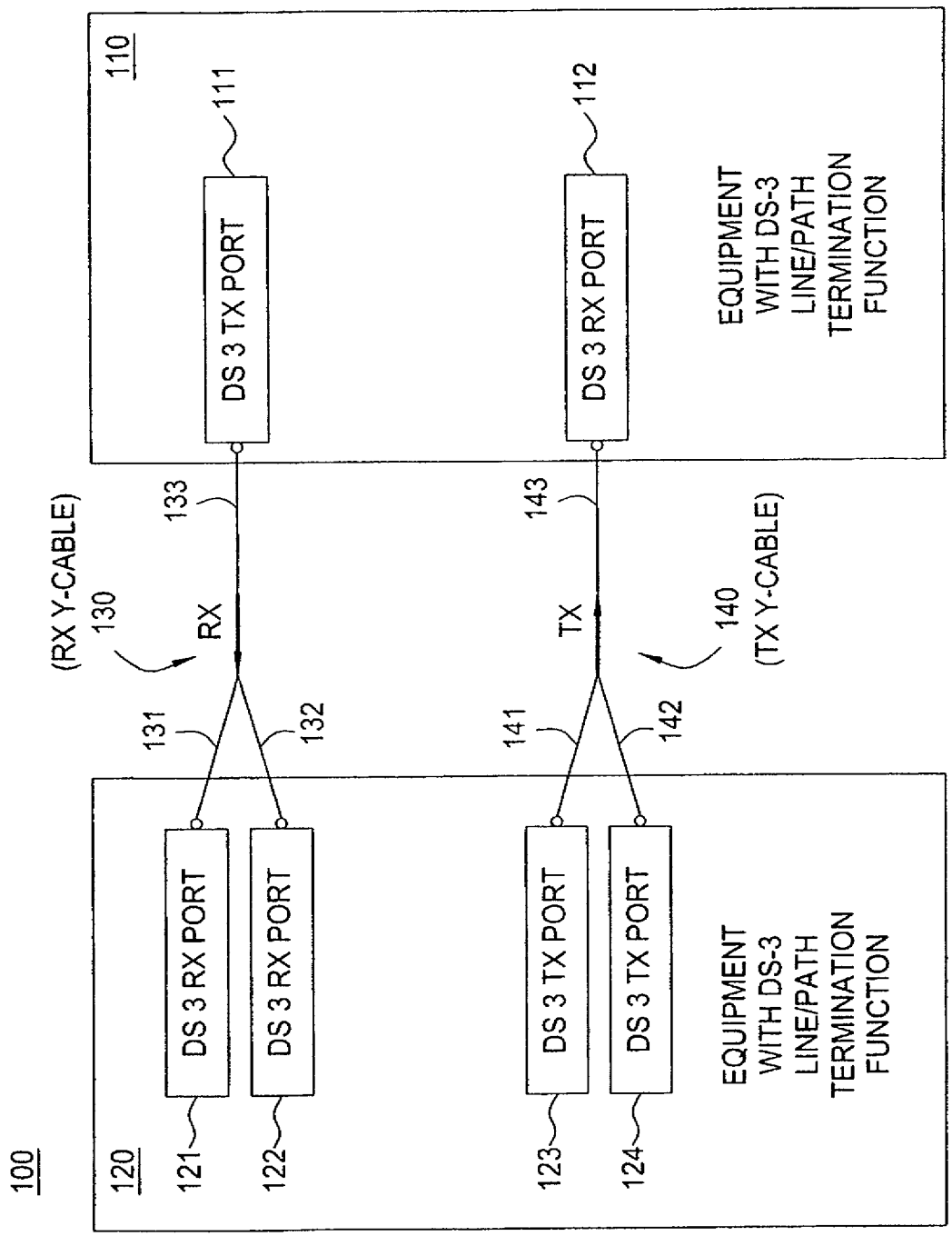
FIG. 1 illustrates an exemplary Y-cable configuration for interconnecting network equipment related to the present invention.

FIG. 1 illustrates an exemplary Y-cable configuration for interconnecting network equipment in a network provider's network. Configuration 100 shows two pieces of network equipment 110, 120 with DS3 line and path termination functions are interconnected by a pair of Y-cables 130, 140. Other types of electrical line interface can be configured and applied similarly as shown in FIG. 1 as well. These electrical interfaces include, but are not limited to, DS1, DS3, E1, and E3 as well. DS1 (Digital Signal Level 1) is an electrical interface capable of delivering 1.544 Mbps of bidirectional bandwidth as defined by the American National Standards Institute (ANSI). DS3 (Digital Signal Level 3) is an electrical interface capable of delivering 44.736 Mbps of bidirectional bandwidth as defined by the ANSI. E1 (European Signal level 1) is an electrical interface capable of delivering 2.048 Mbps of bidirectional bandwidth as defined by the International Telecommunication Union—Sector T (ITU-T). E3 (European Signal level 3) is an electrical interface capable of delivering 34.368 Mbps of bidirectional bandwidth as defined by the ITU-T. In FIG. 1, the network equipment with DS3 line and path termination functions can be, but is not limited to, a digital TDM cross-connect, a Frame Relay switch, an ATM switch, an MPLS switch, an IP router and the like.

From the perspective of equipment 120, receive Y-cable 130 interconnects DS3 receive ports 121 and 122 to the transmit port 111 on equipment 110 using connectors 131, 132, and 133 respectively. Similarly, transmit Y-cable 140 interconnects DS3 transmit ports 123 and 124 to the receive port 112 on equipment 110 using connectors 141, 142, and 143 respectively. Data sent by transmit port 111 over Y-cable 130 using connector 133 are split into two identical data streams. One stream travels through connector 131 to receive port 121 and the other identical stream travels through connector 132 to receive port 122. Both receive ports 121 and 122 will be active at the same time. In the reverse direction, only transmit port 123 or 124 will be active one at a time. In other words, transmit ports 123 and 124 will not transmit at the same time. If transmit port 123 is active and transmitting, data stream will travel through connector 141 over Y-cable 140 through connector 143 to receive port 112. If transmit port 124 is active and transmitting, data stream will travel through connector 142 over Y-cable 140 through connector 143 to receive port 112.

It should be noted that network equipment 120 provides DS3 line level redundancy to enhance the overall network reliability as shown in FIG. 1. In contrast, network equipment 110 provides no redundancy, e.g., to reduce the overall network capital costs. Configuration 100 is typically deployed in this fashion when network equipment 120 has slightly lower overall equipment reliability than that of network equipment 110. In other words, redundancy is added to the piece of network equipment that will benefit from such addition to enhance overall network reliability.

Figure 2:
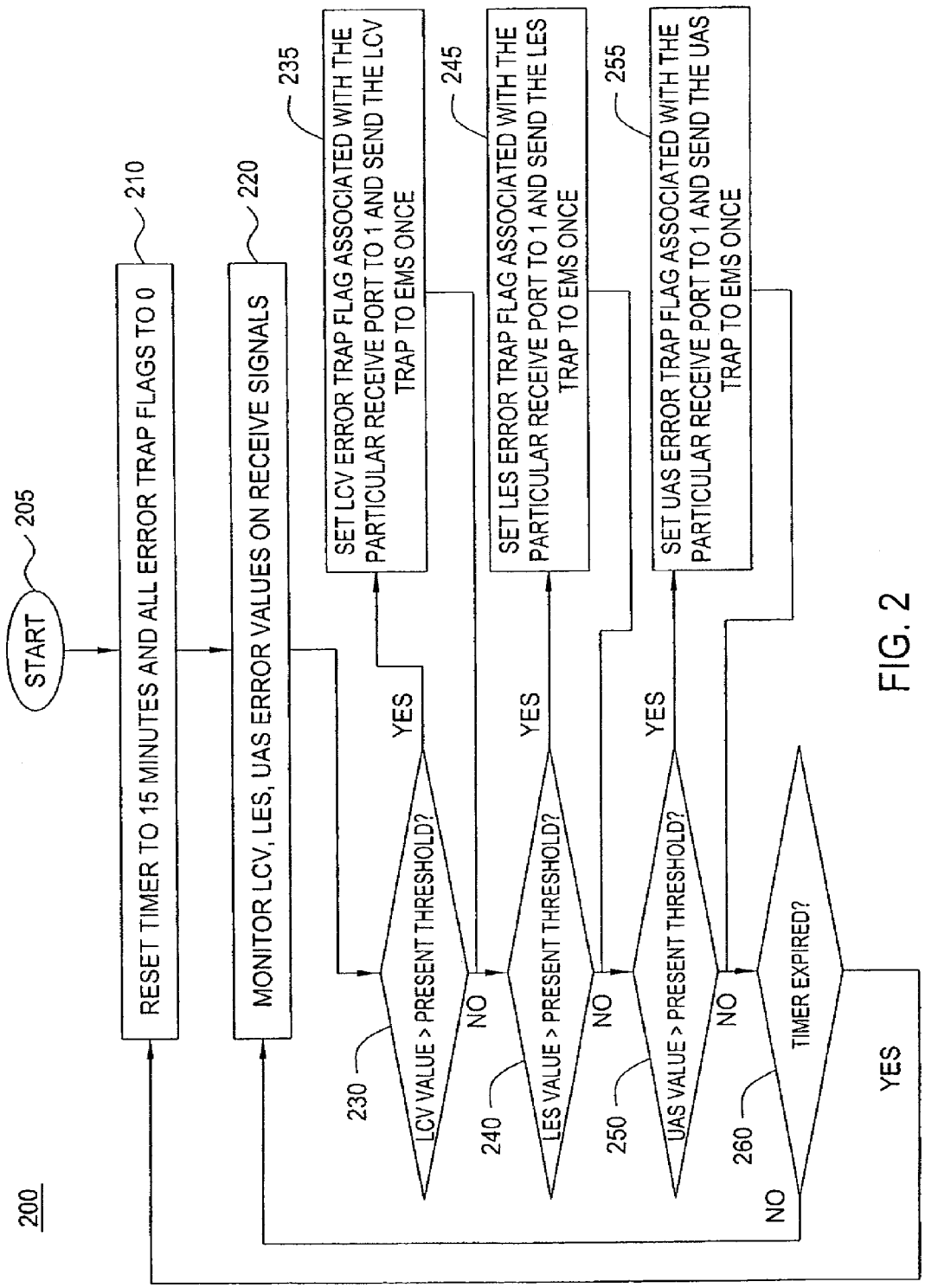
FIG. 2 illustrates a flowchart of a method for monitoring performance data on receive ports of a piece of network equipment of the present invention.

FIG. 2 illustrates a flowchart of a method 200 for monitoring performance data on receive ports of a piece of network equipment with DS3 line and path terminating functions. In particular, network equipment which has port redundancy equipped, such as network equipment 120, will be performing this monitoring method on all receive ports with cables, e.g., Y-cables, attached. Method 200 starts in step 205 and proceeds to step 210.

In step 210, the method 200 resets a timer to starts counting down from a predefined period of time (a first predefined period of time), e.g., 15 minutes, and resets all error trap flags to 0. An error trap flag is basically an indicator that keeps track of the error status of certain error performance measurement (or transmission line performance parameters), e.g. Line Code Violation (LCV) measurement, Line Errored Second (LES) measurement, Unavailable Second (UAS) measurement, and etc. LCV is the occurrence of either a Bipolar Violation (BPV) or Excessive Zeroes (EXZ) error event in a transmission line. LES is the occurrence of one or more bit errors during a one second interval in the transmission line. UAS is the occurrence of ten consecutive Severely Errored Second (SES) error events in a transmission line. When an error count of a particular error trap has exceeded a preset threshold T, the error trap flag associated with the particular error type will be changed from 0 to 1 to indicate a threshold crossing event has occurred. The threshold T is a set of configurable parameters set by the network provider. In one exemplary embodiment, T is set to 3870 for LCV error type, 86 for LES error type, and 120 for UAS error type. Note also that a network element typically keeps track of error measurements in a predefined period of time, e.g., 15 minute interval bins, for each individual error type such as LCV, LES, and UAS. The current 15 minute error count bin contains the actual error counts of an individual error type that occurs during the current 15 minute window. When the 15 minute interval is up, the value of the current 15 minute error count will be stored in the last 15 minute error count bin and the current 15 minute error count will also be added to a larger predefined time period (a second predefined period of time), e.g., a 24 hour error count bin, to produce a cumulative error count during a 24 hour time interval. Then, the current 15 minute error count bin value will be reset to 0 at the beginning of the new 15 minute interval to restart the error counting process for the current 15 minute error count bin. When the 24 hour interval is up, the value of the 24 hour error count bin will be reset to 0 at the beginning of the new 24 hour interval to restart the error counting process for the 24 hour error count bin.

It should be noted there may be other parameters that can be monitored, e.g., Line Severely Errored Seconds(LSES), P-bit Coding Violations(PCV), P-bit Errored Seconds(PES), P-bit Severely Errored Seconds(PSES), Severely Errored Seconds(SES), Severely Errored Framing Seconds(SEFS), C-bit coding violations(CCV), C-bit errored seconds(CES), and C-bit errored seconds(CSES). However, in one embodiment, the present invention generates a signature only in accordance with LCV, LES, and UAS. It has been observed that these three parameters are more pertinent in predicting an imminent or potential failure of the cable. However, it should be noted that the present invention can be adapted to use any combination of the LCV, LES, and UAS parameters and, if necessary, one or more of the above parameters that are not currently used in the present embodiment.

In step 220, the method monitors the performance level of LCV, LES, and UAS error performance measurements on the incoming line signal. In step 230, the method checks if the LCV error measurement count in the current 15 minute interval has exceeded the preset LCV threshold. If the current 15 minute LCV error measurement count has exceeded the preset LCV threshold, the method proceeds to step 235; otherwise, the method proceeds to step 240. In step 235, the method sets the LCV error trap flag bit to 1 and sends a LCV error trap message to the Element Management System (EMS). An EMS is a management system that provides management related functions for a particular type of network elements residing within the network. The LCV error trap is only sent once during the current 15 minute interval when the LCV error count threshold is crossed. No additional LCV error trap will be sent to the NMS even the current 15 minute LCV error count continues to grow. This helps reduce the error trap message volume flow to the EMS.

In step 240, the method checks if the LES error measurement count in the current 15 minute interval has exceeded the preset LES threshold. If the current 15 minute LES error measurement count has exceeded the preset LES threshold, the method proceeds to step 245; otherwise, the method proceeds to step 250. In step 245, the method sets the LES error trap flag bit to 1 and sends a LES error trap message to the Element Management System (EMS). The LES error trap is only sent once during the current 15 minute interval when the LES error count threshold is crossed. No additional LES error trap will be sent to the NMS even the current 15 minute LES error count continues to grow. This helps reduce the error trap message volume flow to the EMS.

In step 250, the method checks if the UAS error measurement count in the current 15 minute interval has exceeded the preset UAS threshold. If the current 15 minute UAS error measurement count has exceeded the preset UAS threshold, the method proceeds to step 255; otherwise, the method proceeds to step 260. In step 255, the method sets the UAS error trap flag bit to 1 and sends a UAS error trap message to the Element Management System (EMS). The UAS error trap is only sent once during the current 15 minute interval when the UAS error count threshold is crossed. No additional UAS error trap will be sent to the NMS even the current 15 minute UAS error count continues to grow. This helps reduce the error trap message volume flow to the EMS.

In step 260, the method checks if the timer has expired. If the timer has expired, the method proceeds back to step 210; otherwise, the method proceeds back to step 220.

Figure 3:
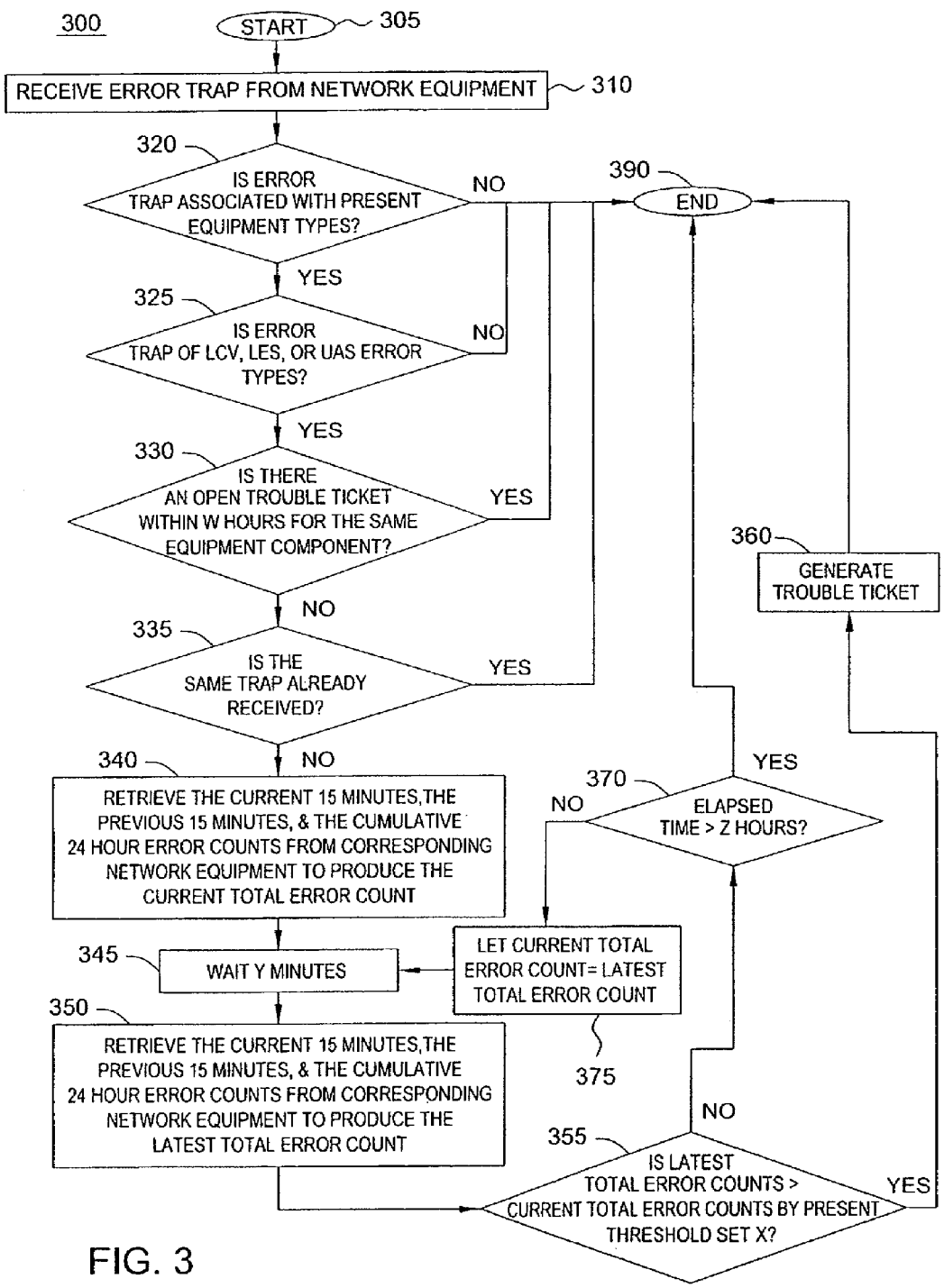
FIG. 3 illustrates a flowchart of a method for signature based predictive maintenance of Y-cable of the present invention.

FIG. 3 illustrates a flowchart of a method 300 for signature based predictive maintenance of cables, e.g., Y-cables. The method is performed by the EMS that monitors particular network elements within the network. Method 300 starts in step 305 and proceeds to step 310.

In step 310, the method 300 receives an error trap message from a network element. For example, the error trap message is received by the EMS.

In step 320, the method checks if the received error trap is associated with a set of predefined network element types with a set of predefined line cards configured on these network element types with the splitting ends of Y-cables connected to them. If the received error trap is associated with Y-cabling configuration, the method proceeds to step 325; otherwise, the method proceeds to step 390.

In step 325, the method 300 checks if the trap is triggered by a LCV, a LES, or an UAS threshold crossing event. If the error trap is triggered by one of these aforementioned events, the method proceeds to step 330; otherwise, the method proceeds to step 390.

In step 330, the method checks if there is an existing trouble ticket already open within the last W hours (e.g., a predefined period of time) for this particular error trap, where W is a configurable parameters set by the network provider. In one exemplary embodiment, W is set to 12 hours. If there is already an existing trouble ticket associated with this trap, the method proceeds to step 390; otherwise, the method proceeds to step 335.

In step 335, the method 300 checks if the error trap has already been reported previously. If the same error trap has already been reported previously, the method proceeds to step 390; otherwise, the method proceeds to step 340.

In step 340, the method 300 retrieves from the corresponding network element associated with the error trap the current 15 minute error count, the previous 15 minute error count, and the cumulative 24 hour error count for the particular error type reported by the trap. The method then adds the aforementioned three error counts to produce the Current Total Error Count parameter.

In step 345, the method 300 waits Y minutes (a predefined period of time), where Y is a configurable parameter set by the network provider. In one embodiment, Y is set to 15 minutes.

In step 350, the method 300 retrieves from the corresponding network element of associated with the error trap the current 15 minute error count, the previous 15 minute error count, and the cumulative 24 hour error count for the particular error type reported by the trap. The method then adds the aforementioned three error counts to produce the Latest Total Error Count parameter.

In step 355, the method 300 checks if the Latest Total Error Count has exceeded the Current Total Error Count by a predefined threshold, X, for the particular error type reported by the error trap. The threshold X is a set of configurable parameters set by the network provider. In one embodiment, X is set to 50 for LCV error type, 20 for LES error type, and 10 for UAS error type. If the predefined threshold has been exceeded, the method proceeds to step 360; otherwise, the method proceeds to step 370.

In step 360, the method generates a trouble ticket to indicate that the Y-cable associated with the error trap has to be replaced due to imminent failures and maintenance staff will be dispatched automatically to perform such replacement. In other words, by crossing various thresholds, a particular cable has produced a "signature" that indicates deteriorating performance of the particular cable, i.e., an imminent or potential failure of the cable. Thus, by detecting the failure signature of a cable, the present invention is able to preemptively schedule the maintenance and/or replacement of the pertinent cable well before the cable actually fails.

In step 370, the method 300 checks if the elapsed time of the current running method has exceeded Z hours (a predefined period of time), where Z is a configurable parameter set by the network provider. In one embodiment, Z is set to 8 hours. If the elapsed time has exceeded Z hours, the method proceeds to step 390; otherwise, the method proceeds to step 375. In step 375, the method sets the Current Total Error Count parameter with the value of the Latest Total Error Count parameter and then proceeds back to step 345. The method ends in step 390.

The present invention has tremendous value in both improving customer experience, and reducing a network service provider's operations cost associated with resolving and managing these problems. In one embodiment, this invention addresses a well known industry problem, e.g., a Y-cable failure, by building a data analysis method that focuses on the detection of a pending failure signature, and then maximizes automation capabilities to minimize service outages. Although the present invention is disclosed in the context of a Y-cable, the present invention is not so limited. Namely, the present invention can be adapted to other types of cables or cable configurations.

Figure 4:
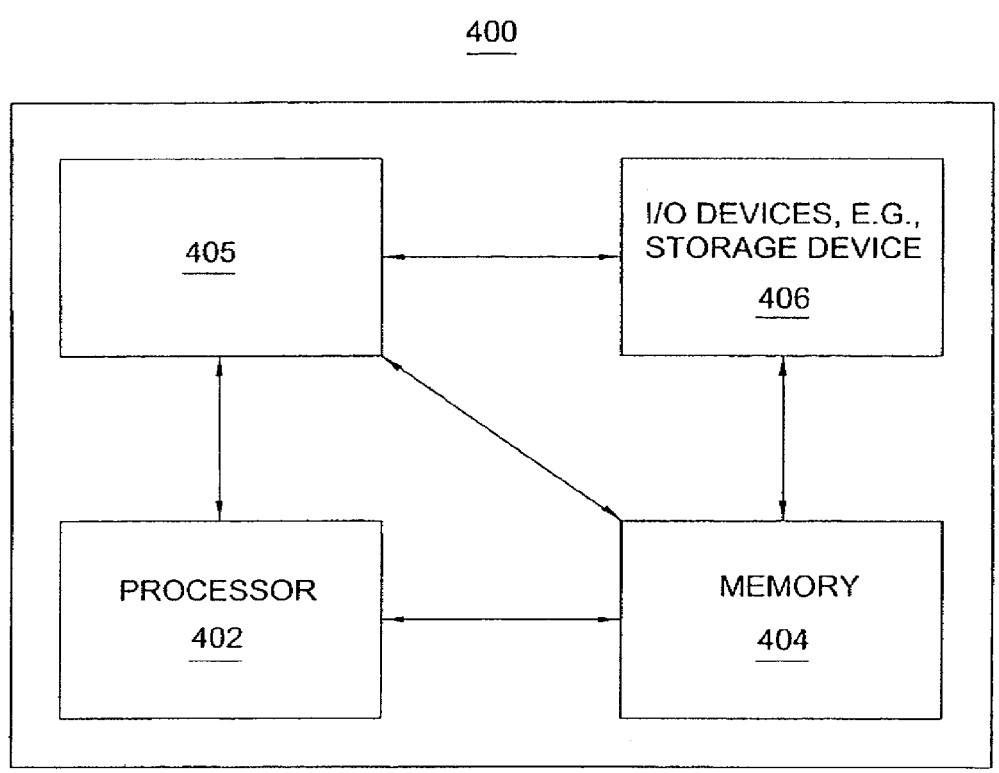
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a Signature Based Predictive Maintenance module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present Signature Based Predictive Maintenance module or process 405 can be loaded into memory 404 and executed by processor 402 to implement the functions as discussed above. As such, the present Signature Based Predictive Maintenance process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating a trouble ticket in a communication network, comprising:
   detecting, by a processor, a signature of a cable, where the cable is for coupling network elements within the communication network, wherein the detecting comprises determining if a latest total error count is greater than a current total error count by an amount larger than a threshold, where the signature indicates that a failure of the cable is imminent before the cable actually fails, and wherein the signature is based on a transmission line performance parameter; and
   generating, by the processor, the trouble ticket for servicing the cable in accordance with the signature.

2. The method of claim 1, wherein the communication network comprises a packet network.

3. The method of claim 1, wherein the cable is a Y-cable.

4. The method of claim 3, wherein the Y-cable comprises three connectors for coupling with ports of a plurality of line cards.

5. The method of claim 1, wherein the transmission line performance parameter comprises a line code violation parameter.

6. The method of claim 1, wherein the detecting comprises:
   monitoring the transmission line performance parameter within a first period of time; and
   sending a corresponding error trap flag if a corresponding threshold that is set for the transmission line performance parameter is exceeded, where the error trap flag is sent to an element management system.

7. The method of claim 6, wherein the signature is premised on measurements collected on the transmission line performance parameter over the first period of time and a second period of time, where the second period of time is a longer period of time than the first period of time.

8. The method of claim 1, wherein the network elements comprise at least one of: a cross-connect, a switch, and a router.

9. The method of claim 1, wherein the transmission line performance parameter comprises a line errored second parameter.

10. The method of claim 1, wherein the transmission line performance parameter comprises an unavailable second parameter.

11. A non-transitory computer-readable storage medium storing a plurality of instructions which, when executed by a processor, cause the processor to perform operations for generating a trouble ticket in a communication network, the operations comprising:
   detecting a signature of a cable, where the cable is for coupling network elements within the communication network, wherein the detecting comprises determining if a latest total error count is greater than a current total error count by an amount larger than a threshold, where the signature indicates that a failure of the cable is imminent before the cable actually fails, and wherein the signature is based on a transmission line performance parameter; and
   generating the trouble ticket for servicing the cable in accordance with the signature.

12. The non-transitory computer-readable storage medium of claim 11, wherein the communication network comprises a packet network.

13. The non-transitory computer-readable storage medium of claim 11, wherein the cable is a Y-cable.

14. The non-transitory computer-readable storage medium of claim 11, wherein the Y-cable comprises three connectors for coupling with ports of a plurality of line cards.

15. The non-transitory computer-readable storage medium of claim 11, wherein the transmission line performance parameter comprises: a line code violation parameter.

16. The non-transitory computer-readable storage medium of claim 11, wherein the detecting comprises:
   monitoring the transmission line performance parameter within a first period of time; and
   sending a corresponding error trap flag if a corresponding threshold that is set for the transmission line performance parameter is exceeded, where the error trap flag is sent to an element management system.

17. The non-transitory computer-readable storage medium of claim 11, wherein the signature is premised on measurements collected on the transmission line performance parameter over the first period of time and a second period of time, where the second period of time is a longer period of time than the first period of time.

18. The non-transitory computer-readable storage medium of claim 11, wherein the network elements comprise at least one of: a cross-connect, a switch, and a router.

19. An apparatus for generating a trouble ticket in a communication network, comprising:
   a processor; and
   a computer-readable medium storing a plurality of instructions which, when executed by the processor, cause the processor to perform operations, the operations comprising:
      detecting a signature of a cable, where the cable is for coupling network elements within the communication network, wherein the detecting comprises determining if a latest total error count is greater than a current total error count by an amount larger than a threshold, where the signature indicates that a failure of the cable is imminent before the cable actually fails, and wherein the signature is based on a transmission line performance parameter; and
      generating the trouble ticket for servicing the cable in accordance with the signature.

20. The apparatus of claim 19, wherein the cable is a Y-cable.

* * * * *